United States Patent [19]
Chaney et al.

[11] Patent Number: 6,064,378
[45] Date of Patent: May 16, 2000

[54] PROGRAM GUIDE IN A DIGITAL VIDEO SYSTEM

[75] Inventors: John W. Chaney, Gilroy, Calif.; Bill W. Beyers, Jr., Carmel, Ind.; Michael W. Johnson, Indianapolis, Ind.; James E. Hailey, Indianapolis, Ind.; Kevin E. Bridgewater, Indianapolis, Ind.; Michael S. Deiss, Zionsville, Ind.; Raymond S. Horton, McKinney, Tex.

[73] Assignee: Thomson Consumer Electronics, Inc., Indianapolis, Ind.

[21] Appl. No.: 09/176,567

[22] Filed: Oct. 21, 1998

Related U.S. Application Data

[62] Division of application No. 08/806,574, Feb. 25, 1997, Pat. No. 5,867,207, which is a division of application No. 08/363,235, Dec. 23, 1994, Pat. No. 5,642,153.

[51] Int. Cl.[7] ........................................... H04N 5/50
[52] U.S. Cl. .......................... 345/327; 348/906; 348/465
[58] Field of Search .................................. 348/906, 569, 348/564, 563, 465, 461, 469; 345/327, 328

[56] References Cited

U.S. PATENT DOCUMENTS

| | | | |
|---|---|---|---|
| 4,903,126 | 2/1990 | Kassatly | 358/146 |
| 4,908,859 | 3/1990 | Bennet et al. | 380/10 |
| 5,168,356 | 12/1992 | Acampora et al. | 358/133 |
| 5,359,601 | 10/1994 | Wasilewski et al. | 370/73 |
| 5,418,782 | 5/1995 | Wasilewski | 370/73 |
| 5,446,490 | 8/1995 | Blahut et al. | 348/7 |
| 5,515,106 | 5/1996 | Chaney et al. | 348/906 |
| 5,521,927 | 5/1996 | Kim et al. | 370/94.2 |
| 5,548,532 | 8/1996 | Menand et al. | 364/514 C |
| 5,552,833 | 9/1996 | Henmi et al. | 348/906 |
| 5,563,648 | 10/1996 | Menand et al. | 348/13 |
| 5,565,923 | 10/1996 | Zdepski | 348/423 |
| 5,576,755 | 11/1996 | Davis et al. | 348/906 |
| 5,596,373 | 1/1997 | White et al. | 348/569 |
| 5,635,978 | 6/1997 | Alten | 342/906 |
| 5,652,749 | 7/1997 | Davenport et al. | 370/466 |

FOREIGN PATENT DOCUMENTS

WO 91/03112  3/1991  WIPO.

OTHER PUBLICATIONS

R. Boyer, Digital Broadcast Satellite System, May 10, 1993, pp. 458–462, Cable TV Sessions, Montreux.

J. Cox, et al, Extended Services in a Digital Compression System, Jun. 6, 1993, pp. 185–191, Proceedings from Eleven Technical Sessions of the Annual Convention and Exposition of the National Cable Television Association.

M. Daily, Addressable Decoder with Downloadable Operation, Jun. 6, 1993, pp. 82–89, Proceedings from Eleven Technical Sessions of the Annual Convention and Exposition of the National Cable Television Association.

*Primary Examiner*—Victor R. Kostak
*Attorney, Agent, or Firm*—Joseph S. Tripoli; Robert D. Shedd; Paul P. Kiel

[57] ABSTRACT

Apparatus and method for acquiring a program from a packetized signal in response to ancillary information included in the packetized signal. The packetized signal includes a plurality of program signals and ancillary information associated with the plurality of program signals. The apparatus includes means for identifying the ancillary information from the packetized signal, the ancillary information including master guide information for use in identifying and acquiring special guide information, and special guide information for use in acquiring program information associated with the plurality of program signals. The program signals may be acquired using identifier information that may be derived from the ancillary information. The apparatus includes means responsive to the ancillary information for acquiring a selected program from the packetized signal.

21 Claims, 10 Drawing Sheets

| CH 150 | | | | | 7:35 PM |
|---|---|---|---|---|---|
| | | Program Guide | | | |
| | 7:30 PM | 8:00 PM | 8:30 PM | 9:00 PM | |
| HBO 102 | OTHER PEOPLE'S MONEY | | FREE PREVIEW | DREAM ON | |
| CBS 106 | EVENING NEWS | FRANNIE'S TURN | BROOKLYN BRIDGE | RAVEN | |
| WTTV 150 | MASH | IMMEDIATE FAMILY | | | |
| CINE 210 | EYEWITNESS | FUN CITY | | DOUBLE TROUBLE | |
| CNN 305 | PRIME NEWS | BOTH SIDES | RELIABLE SOURCES | WORLD NEWS | |
| USA 422 | COUNTER STRIKE | | QUANTUM LEAP | | |
| MORE | MOVIES | SPORTS | OTHER | ALL | EXIT |

FIG. 3

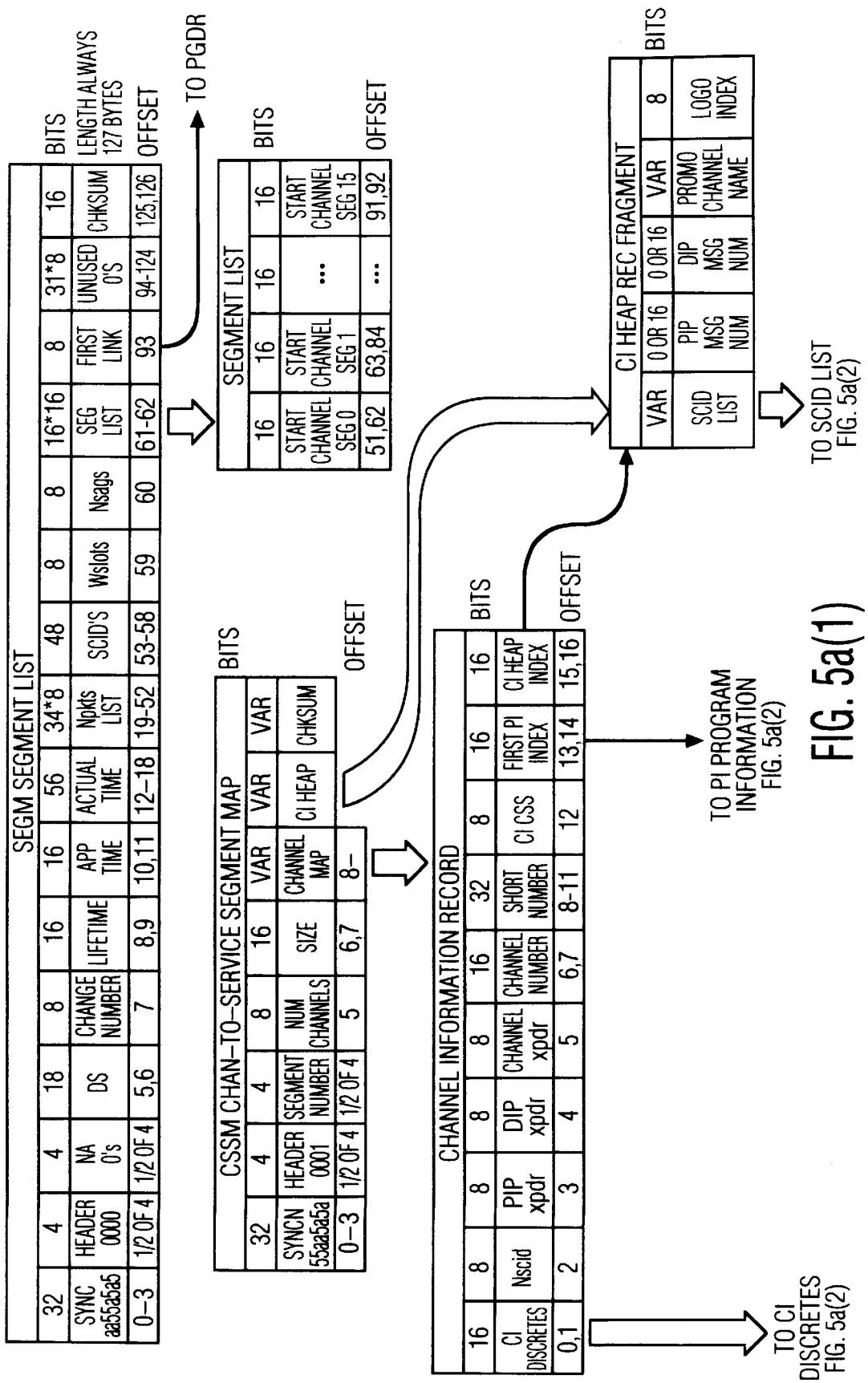
FIG. 5a(1)

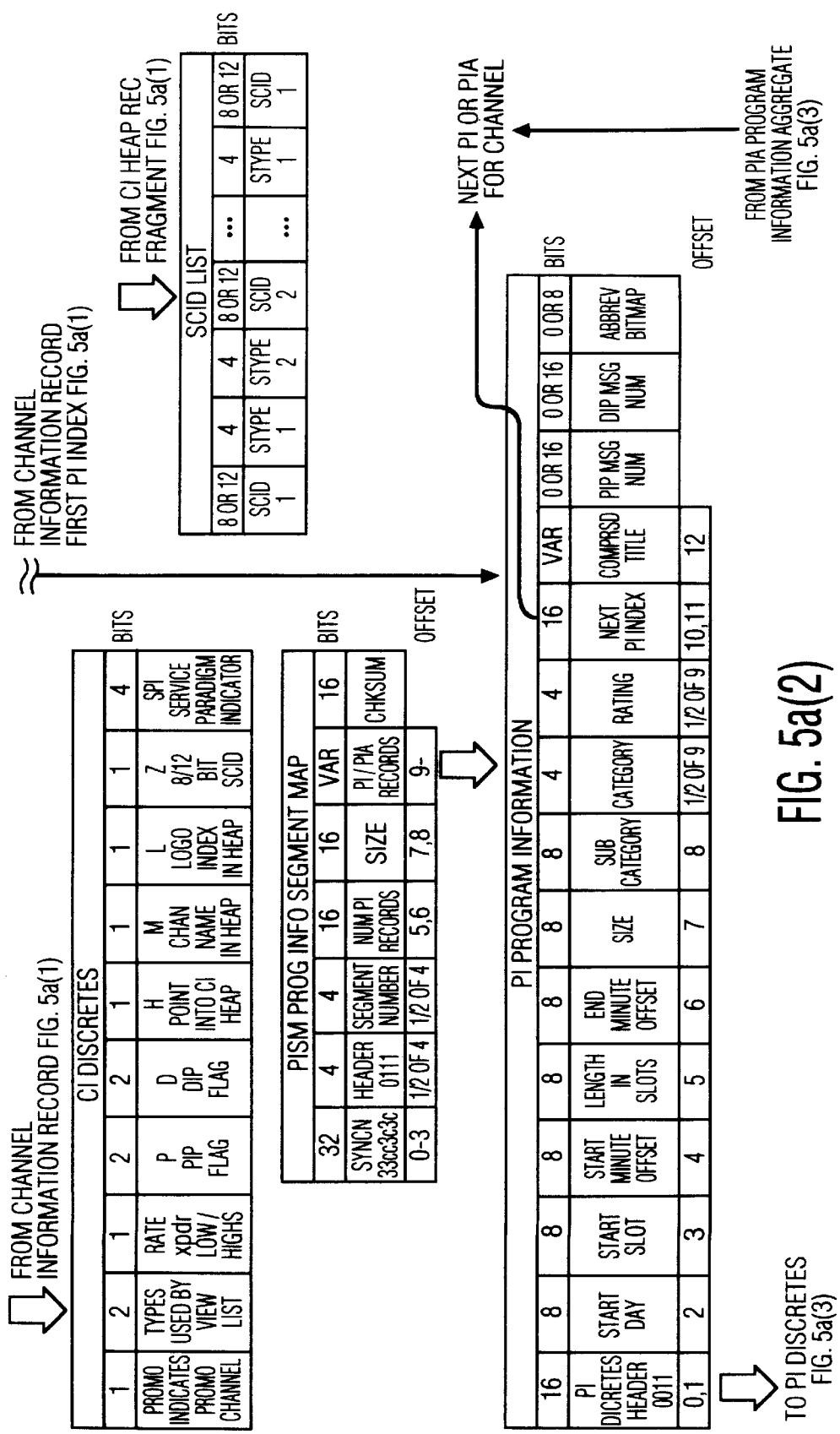
FIG. 5a(2)

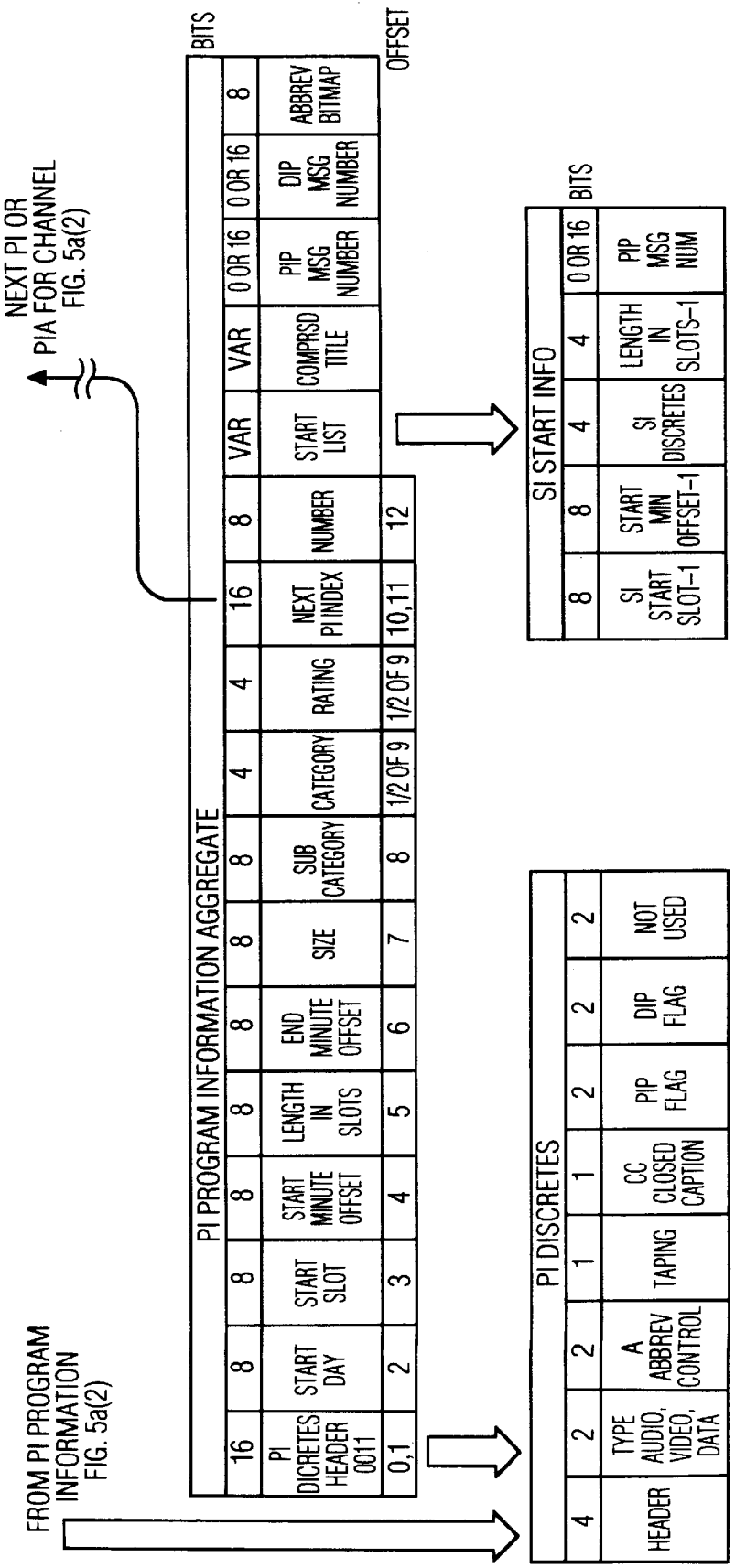
FIG. 5a(3)

PROGRAM GUIDE IN A DIGITAL VIDEO SYSTEM

This application is a divisional application of U.S. patent application Ser. No. 08/806,574 filed Feb. 25, 1997, now U.S. Pat. No. 5,867,207 which is a divisional application of U.S. patent application Ser. No. 08/363,235 filed Dec. 23, 1994, now U.S. Pat. No. 5,642,153.

FIELD OF THE INVENTION

This invention is related to the field of digital communications systems, and is described with reference to a digital satellite television system, but also may be applicable to a digital cable system or digital terrestrial broadcast system. The invention also concerns screen displays and user menus for controlling such a system.

BACKGROUND OF THE INVENTION

In a satellite television communication system, the satellite receives a signal representing audio, video, or data information from an earth-based transmitter. The satellite amplifies and rebroadcasts this signal to a plurality of receivers, located at the homes of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence. The subject matter of the present invention is especially concerned with a downlink receiving unit designed for relatively easy installation at the user's residence.

The present system utilizes two satellites within a few degrees of each other in geosynchronous earth-orbit stationed at an altitude of 22,300 miles, approximately over the state of Texas. With this arrangement, receivers located anywhere in the contiguous 48 states of the United States can receive signals from both satellites on the same receiving antenna dish without having to reposition the antenna dish. Each satellite transmits its signals with a respective polarization. Selecting a satellite for reception of its signals is accomplished at the receiving antenna by selecting those signals with the appropriate polarization. Each satellite includes sixteen transponders for transmitting signals to the receiving antenna dish over a range of frequencies. Each transponder is time-multiplexed to convey a plurality of television channels (e.g., six to eight channels), substantially simultaneously. The satellite signals are transmitted in compressed and packetized form. and comprise television and ancillary data signals. Because the system is capable of carrying as many as two hundred fifty-six channels, some television program selection method and apparatus, which is easy to understand and operate, must be provided for the user.

If we look to conventional analog VHF and UHF broadcast television as a guide, we find that the solution provided therein is of little help, for the following reasons. The channel number of a given television station corresponds to a fixed band of frequencies. In other words, channel 6 in the United States is regulated to occupy the range from 82–88 MHz. Most non-technical consumers have no understanding of the frequency allocations of the television broadcast bands. Instead, they tune a desired channel by entering its channel number into their receiver. Their receiver is programmed with the proper information to perform the required tuning to the desired channel by generating the appropriate bandswitching and tuning commands, in response to the entering of the channel number by the user. It is possible for manufacturers to build a fixed channel number-to-frequency translation arrangement into each television receiver, only because the relationship between channel number and frequency band must conform to a broadcast standard.

This fixed-frequency standard is acceptable to the broadcasters because their transmitting equipment is readily accessible for maintenance purposes due to its location on the ground. If the transmitter malfunctions, it can be repaired and the station can be back "on-the-air" at its designated frequency band in a relatively short time. In contrast, a fixed-frequency arrangement for a satellite is undesirable because of the practical inaccessibility of an orbiting satellite. In the event that a transponder malfunctions, that transponder is thereafter inoperative, essentially forever, and receivers programmed to tune that transponder to receive a desired television program would not receive a usable signal. In such an event, the receiver will have lost the desired television channels and will have no idea how to find them.

A satellite receiver may be programmed to perform a function similar to the common autoprogramming function, in which a television receiver searches for all active channels and records detection of each as it is found. If such a system is used after a transponder failure, the failed transponder will be noted and a new active transponder will be found (assuming that the programming has been moved to a new transponder by ground-based control personnel). The user's receiver would then have to perform an internal remapping to associate the desired channel with the new transponder. However, in the event that a power supply module failed in the satellite, several transponders which may receive power from that module may cease transmitting at once. In such an event, the autoprogramming solution given above will not work because several new transponders will be found at the same time as several old transponders are noted as missing. In such a case, the receiver will have no way of allocating the received signals to their proper channels. Moreover, as noted above, since each transponder conveys six to eight channels, the channels assigned to the failed transponder may be distributed among several still-functioning transponders. In that case the receiving antenna will have access to all of the television channels, but the receiver will, quite literally, not know where to look for those channels which have been moved.

SUMMARY OF THE INVENTION

A television system for receiving a plurality of digitally-encoded television programs includes circuitry for selecting a particular digital data transmission channel from a plurality of digital data transmission channels containing a desired digitally-encoded television program in response to a control signal, at least one of the data transmission channels also including television program schedule data. The system also includes user-operable data entry circuitry for entering data, and a controller for generating the above-noted control signal in response to user-entered data. The controller selects a virtual channel from a plurality of virtual channels in response to user-entered data, each virtual channel being subject to reassignment to a different one of said a plurality of digital data transmission channels, the television program schedule data defining the relationship of each of the television programs to respective ones of the plurality of digital data transmission channels. Each digital transmission channel provides a "packetized digital data multiplex" (PDDM) of program guides, audio, video and data. As such, the subject system provides a comprehensive and logical organization for transmission of multiple television programs in digital form useful in both satellite and terrestrial broadcasting.

BRIEF DESCRIPTION OF THE DRAWING

FIG. 3 is an illustration of a program guide screen display in accordance with the invention.

FIGS. 5a and 5b are illustrations of program data structures in accordance with the invention.

DETAILED DESCRIPTION OF THE DRAWING

Figure 1:
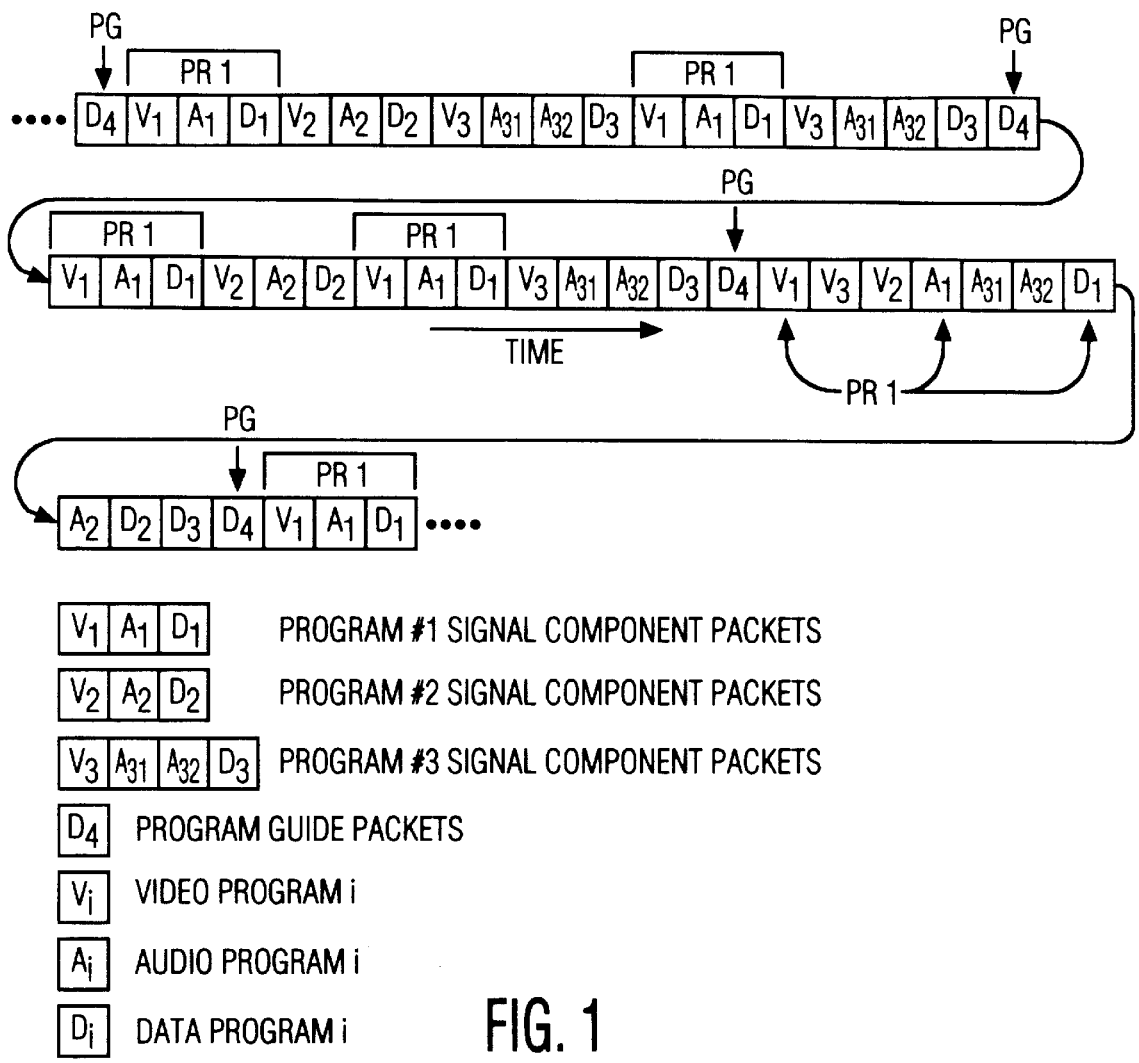
FIGS. 1 and 2 are illustrations of a typical transmitted data stream from a transponder in accordance with the invention.

In the subject system, the information necessary to select a given television program is not fixedly-programmed into each receiver but is rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by the particular transponder. In a system according to the subject invention, it is not possible to tune any channel until the first master program guide is received from the satellite, because the receiver literally does not know where any channel is located, in terms of frequency and position (i.e. data time slot) within the data stream of any transponder. The concept of virtual channels allows allocation of virtual channel numbers by category, such as, sports, movies, news. This realization, in turn, allows for active and inactive virtual channels. That is, ten virtual channels assigned to sporting events on a Saturday afternoon, may be inactivated after the games and may provide enough bandwidth to support, for example, twenty movie channels. Thus, the user has the perception. that he has many more channels than, in fact, could be supported simultaneously, by the available bandwidth. Another words, the concept of virtual channels allows time-multiplexing of the system bandwidth. Moreover, it allows a television program requiring greater bandwidth (such as a sporting event) to "borrow" bits from a second television program on the same transponder which does not require as great a bandwidth (such as a "talk show"). Thus, the available bandwidth of a given transponder can be reallocated, as needed, from one virtual channel to another.

Advantageously, the system is totally flexible in that any program may be assigned, or reassigned at any master program guide transmission time, to any transponder or data time slot, in a fashion which is completely transparent to the user, who sees only the unchanged program title and virtual channel. Thus, the problem of multiple failed transponders can be solved without the user even being aware that it has occurred, by a quickly performed reallocation of the affected television programs to functioning transponders with unused data time slots, and by transmitting a new program guide to the users.

A master program guide is preferably transmitted on all transponders with the television program video and audio data, and is repeated periodically, for example, every 2 seconds. The master program guide is not encrypted, and can be used by the receiver immediately after being received and stored. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

As noted above, the system is capable of transmitting hundreds of programs. Each program may include a number of services. A service is defined herein as a program component, such as a video signal, an audio signal, a closed caption signal, or other data, including executable computer programs for an appropriate receiver. Each service of each program is identified by a unique Service Component Identifier (SCID). The information for the respective services is transmitted in packets of predetermined amounts of data(e.g., 130 bytes) and each packet includes an SCID corresponding to the service.

Figure 2:
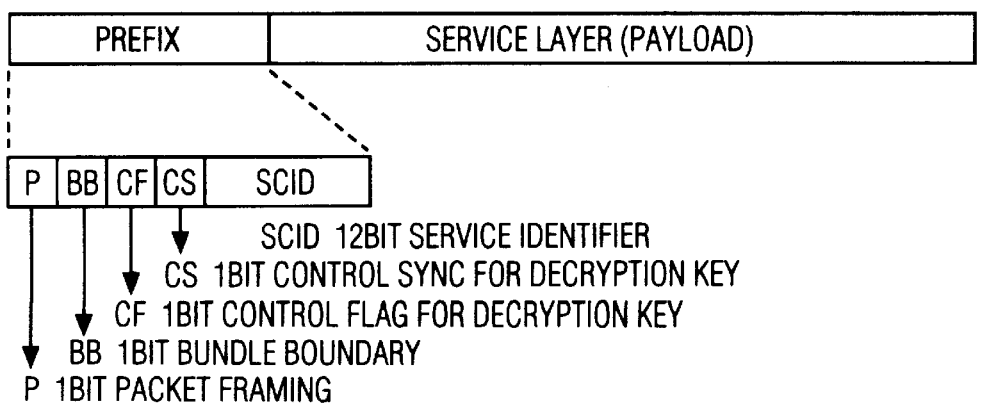

A representation of a typical data stream from one of the transponders is shown in FIG. 1, and a typical packet from that data stream is shown in FIG. 2. In FIG. 1, a string of boxes represents signal packets which are components of a plurality of different television programs transmitted by a given transponder. Packets with letters having like subscripts represent components of a single television program. For example, packet identified as $V_1$, $A_1$ and $D_1$, represent video, audio, and data for program 1. In the upper line of the string of packets, the respective components of a particular program are shown grouped together. However, it is not necessary to group components of a particular program together, as indicated by the packet sequence in the middle of the string. Moreover, there is no requirement to place the packets of a string in any particular order.

The string of packets shown in FIG. 2, represents three time multiplexed programs, programs 1, 2, and 3, plus packets representing a program guide (packets D4). It is important to note that the data of the program guide interrelates program components and virtual channels by virtue of the SCID. The respective packets are arranged to include a prefix and a payload as shown in FIG. 2. The prefix of this example includes two 8-bit bytes comprising five fields, four of which are 1-byte fields (P,BB,CF,CS), and one 12-bit field (SCID). The Payload portion contains the actual information to be received and processed. The exemplary prefix includes a 1-bit priority field (P); a 1-bit boundary field (BB), which indicates boundaries between significant signal changes; a 1-bit field (CF), which indicates whether or not the payload is scrambled; a1-bit field (CS), which indicates which one of two descrambling keys is to be used to descramble a scrambled payload; and a 12-bit SCID. The remainder of the packet comprises the payload which may include error code parity bits appended to the end of the payload data.

A master program guide comprises packetized data formatted as defined above, and is assigned a specific SCID, such as, 0000 0000 0001. A master program guide comprises four sequential blocks of data, designated, SEGM, APGD, CSSM1. . . CSSMnseg, and PISM1. . . PISMnseg, to be described below.

A master program guide typically includes television schedules for the next two hours, but may include schedules for four, six, or eight hours depending on the size of the memory allocated to store it in the receiver. In addition to the master program guide, there is also provided one or more special program guides (SPG), containing additional data, such as, for example, television program schedules for the following eight hours. That is, the master guide holds all information necessary for selecting current television programs, and the special guides contain information about future television programs. Special guides are downloaded from the satellite as needed and are not retained in memory due to their large size. As shown in FIG. 2, both the master program guide and special program guides are partitioned into a plurality of segments or portions (from 0 to 15) with an index "nseg" indicating the current number of segments comprising the special guide. Each segment carries program information for one or more virtual channels which range from 100 to 999. FIG. 2 shows only an exemplary allocation of virtual channels to segments, and other groupings can be, and are, made at the discretion of the operators at the satellite uplink center. Each special guide segment includes two sequential blocks of data, CSSM1. . . CSSMnseg, and PISM1. . . PISnseg, also to be described below.

The Segment Map (SEGM) block of the master program guide contains information about the partitioning of the channel space into segments, and the number of segments. The Additional Program Guide Data (APGD) block contains a program guide map which indicates which special program guide segments are active, and their location (i.e., the particular transponder carrying the segment), as well as the SCIDs of the respective segments. The APGD block contains program information relating to ratings and theme of a particular television program. The APGD also includes a program guide map associating special guide segments with respective names, numbers, and types.

The master guide and every special guide contain a Channel to Service Segment Map (CSSM) block and a Program Information Segment Map (PISM) block. The CSSM describes virtual channels (channel name, call letters, channel number, type, . . . ) which are in the corresponding segment. The PISM block contains linked lists of program information (title, start time, duration, rating, category, . . . ) that are on each virtual channel described in the corresponding CSSM.

Relevant portions of the data structures shown in FIGS. 3, 4, 5a and 5b will be referred to in the following description of the program selection process. Referring to FIG. 3, a user selects a television program for viewing, by moving a cursor (via operation of remote control up, down, right, and left, direction control keys) to a block of the program guide screen display which contains the name of the desired program. The remote control unit is not shown for simplicity. When a SELECT key of the remote control is pressed, the current x and y position of the cursor is evaluated to derive virtual channel and program time information.

Figure 4:
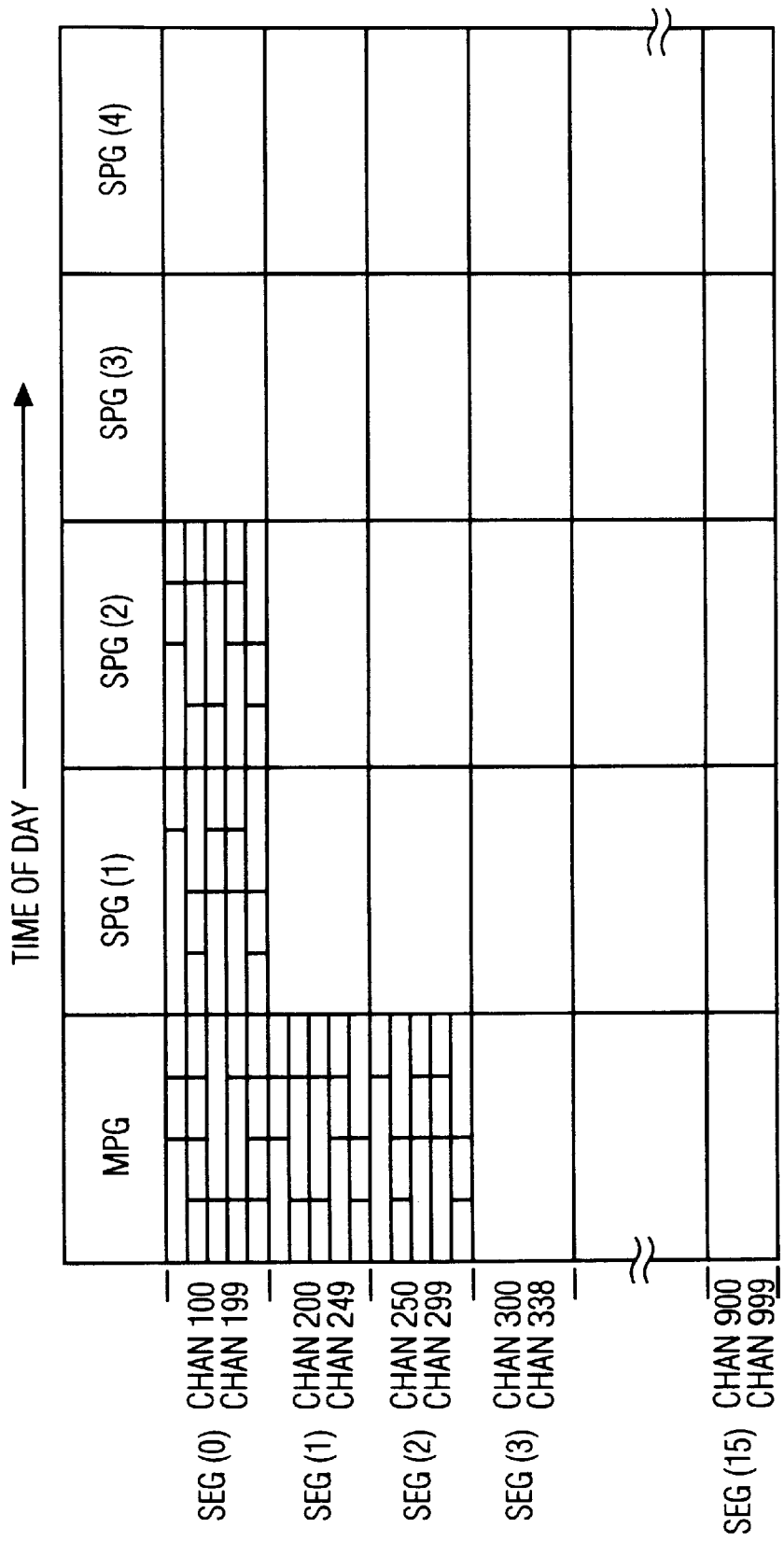
FIG. 4 is an illustration of segmentation of the master program guide and special program guides in accordance with the invention.
Figure 5B:
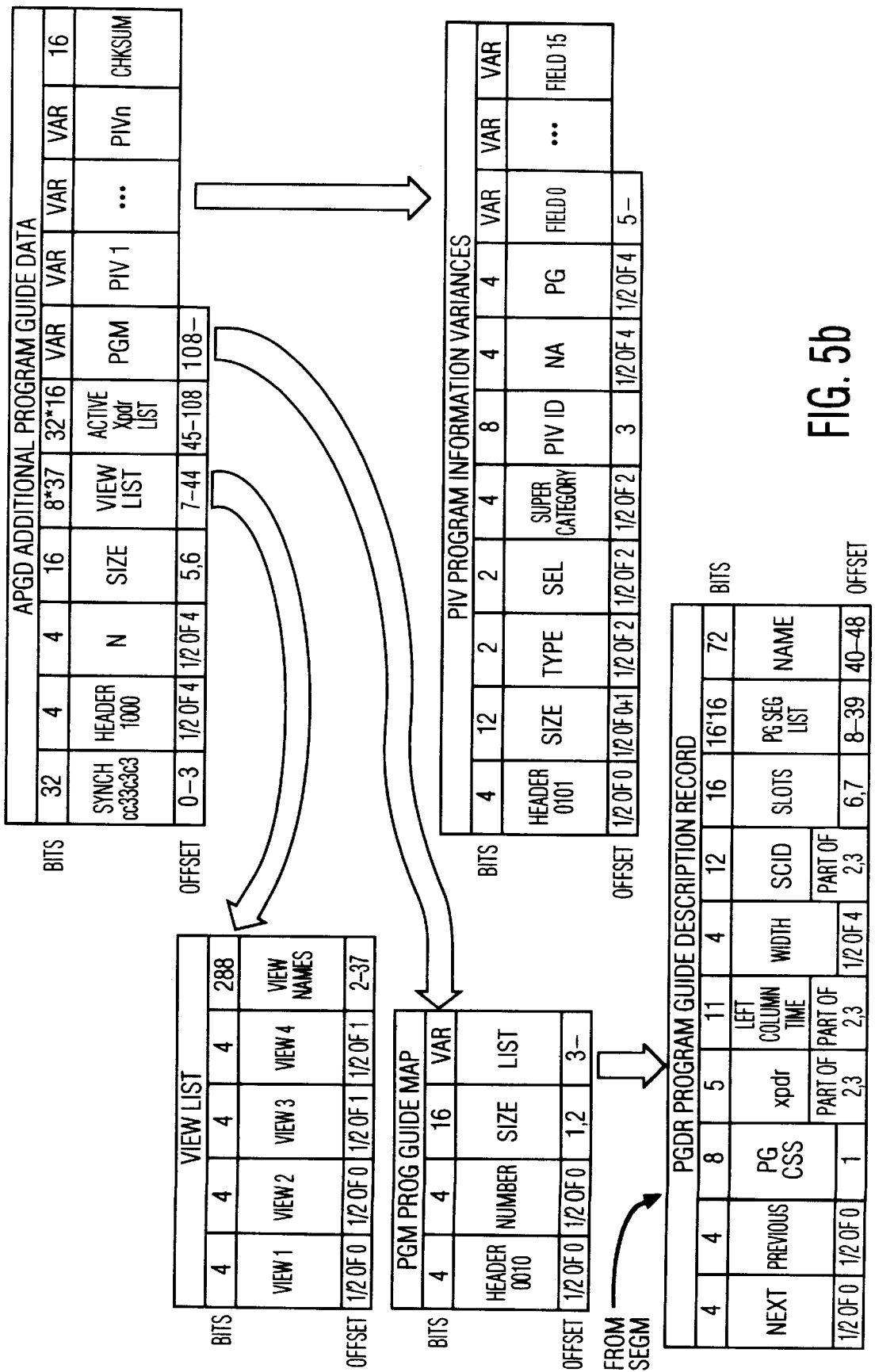

As shown in FIG. 4, and as noted above, the master program guide and special program guides are divided into segments (which may be as little as one segment or as many as 16). The lowest virtual channel (100) is always allocated as the first channel of seg (0). Each segment contains channel and program information for a defined number of virtual channels. Upon deriving the virtual channel number from the X and Y cursor position information, the virtual channel number is used to point into the proper segment of the particular program guide (either master program guide, or a special program guide) to retrieve the specific channel information and program information. Specifically, the Channel Information (CI) Records in the CSSM (Channel to Service Segment Map) are a fixed length of seventeen bytes and contain such items as, the number of SCIDs in use (typically 2, audio and video), the channel transponder (Chan Xpndr) the channel number and short name (i.e., typically 4 characters), and a pointer into the linked program information. In order to access any specific Channel Information (CI) it is only required to repeatedly add 17 to a base value. Program information includes the start day and time of the program, the number of 30 minute slots it occupies, the theme category (i.e., drama, sports, comedy), and parental rating.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver, if the SCID of a particular packet does not match the SCID of the desired television program as listed in the program guide, then that data packet is discarded.

Figure 6:
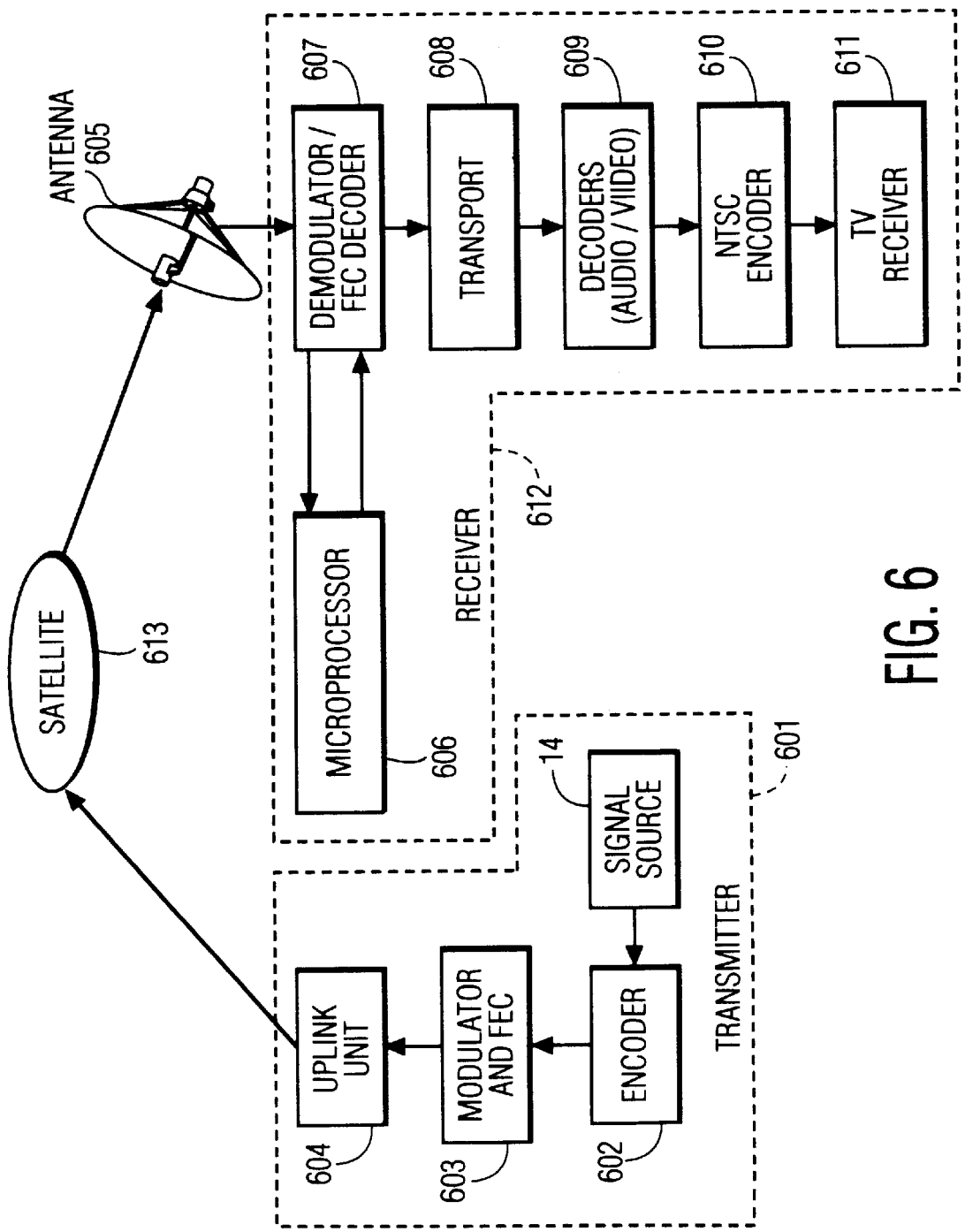
FIG. 6 is a block diagram of a satellite transmitting/receiving system according to the invention.

A brief description of system hardware, suitable for implementing the above-described invention, now follows. In FIG. 6, a transmitter 601 processes a data signal from a source 614 (e.g., a television signal source) and transmits it to a satellite 613 which receives and rebroadcasts the signal to a receiver 612. Transmitter 601 includes an encoder 602, a modulator/forward error corrector (FEC) 603, and an uplink unit 604. Encoder 602 compresses and encodes signals from source 614 according to a predetermined standard such as MPEG. MPEG is an international standard developed by the Moving Picture Expert Group of the International Standards Organization for coded representation of moving pictures and associated audio stored on digital storage medium. An encoded signal from unit 602 is supplied to modulator/Forward Error Corrector (FEC) 603, which encodes the signal with error correction data, and Quaternary Phase Shift Key (QPSK) modulates the encoded signal onto a carrier. Both convolutional and Reed-Solomon (RS) block coding are performed in block 603.

Uplink unit 604 transmits the compressed and encoded signal to satellite 613, which broadcasts the signal to a selected geographic reception area. In this embodiment, satellite 613 operates in two modes, which trade off channel capacity for transmission power, or transmission power for channel capacity. In the first mode, satellite 613 illustratively transmits sixteen channels at 1watts each. In the second mode, satellite 613 transmits eight channels at 240 watts each.

The signal from satellite 613 is received by an antenna dish 605 coupled to an input of a so-called set-top receiver 612 (i.e., an interface device situated atop a television receiver). Receiver 612 includes a demodulator/Forward Error Correction (FEC) decoder 607 to demodulate the signal and to decode the error correction data, a microprocessor 606, which operates interactively with demodulator/FEC unit 607, and a transport unit 608 to transport the signal to an appropriate decoder within unit 609 depending on the content of the signal, i.e., audio or video information. Transport unit 608 receives corrected data packets from unit 607 and checks the header of each packet to determine its routing. Decoders in unit 609 decode the signal and remove added transport data, if used. An NTSC Encoder 610 encodes the decoded signal to a format suitable for use by signal processing circuits in a standard NTSC consumer television receiver 611.

Figure 7:
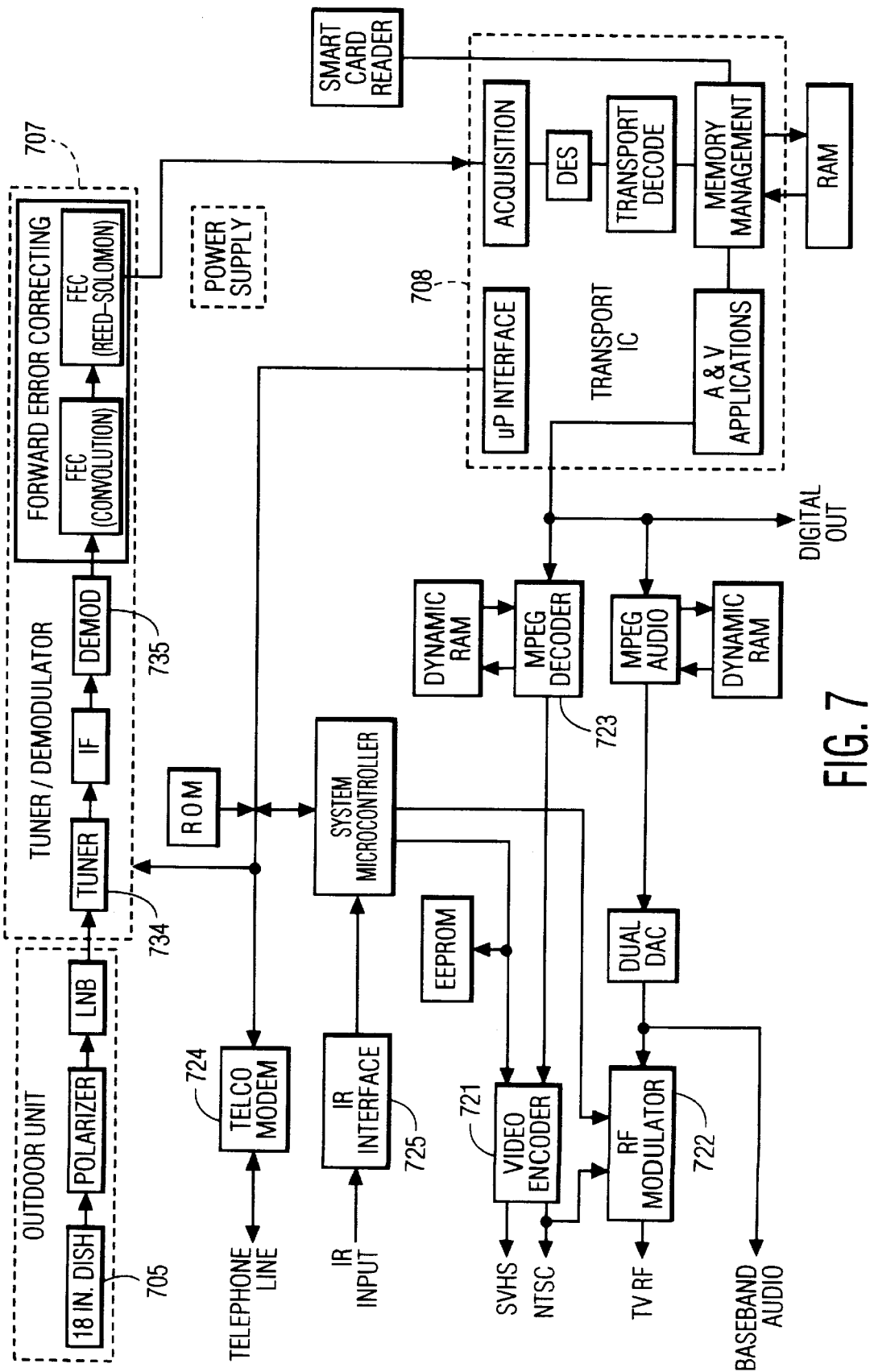
FIG. 7 is a block diagram of the IRD receiver unit.

FIG. 7 is a block diagram showing the components of the IRD receiver system including the outdoor antenna dish unit 7-5. The IRD inclues a block 707 including a tuner 734 and a demodulator unit 73for tuning various television signals. The IRD is under control of a microcontroller 706, which also controls the interfaces between the IRD and a telephone network via a telephone modem 734, between the IRD and a user via an IR link 725 and between the IRD and a television receiver via an MPEG decoder 723, a video encoder 721, and an RF modulator 722, and finally, between the IRD unit and a user via a smart card interface and transport IC 708.

Figure 8:
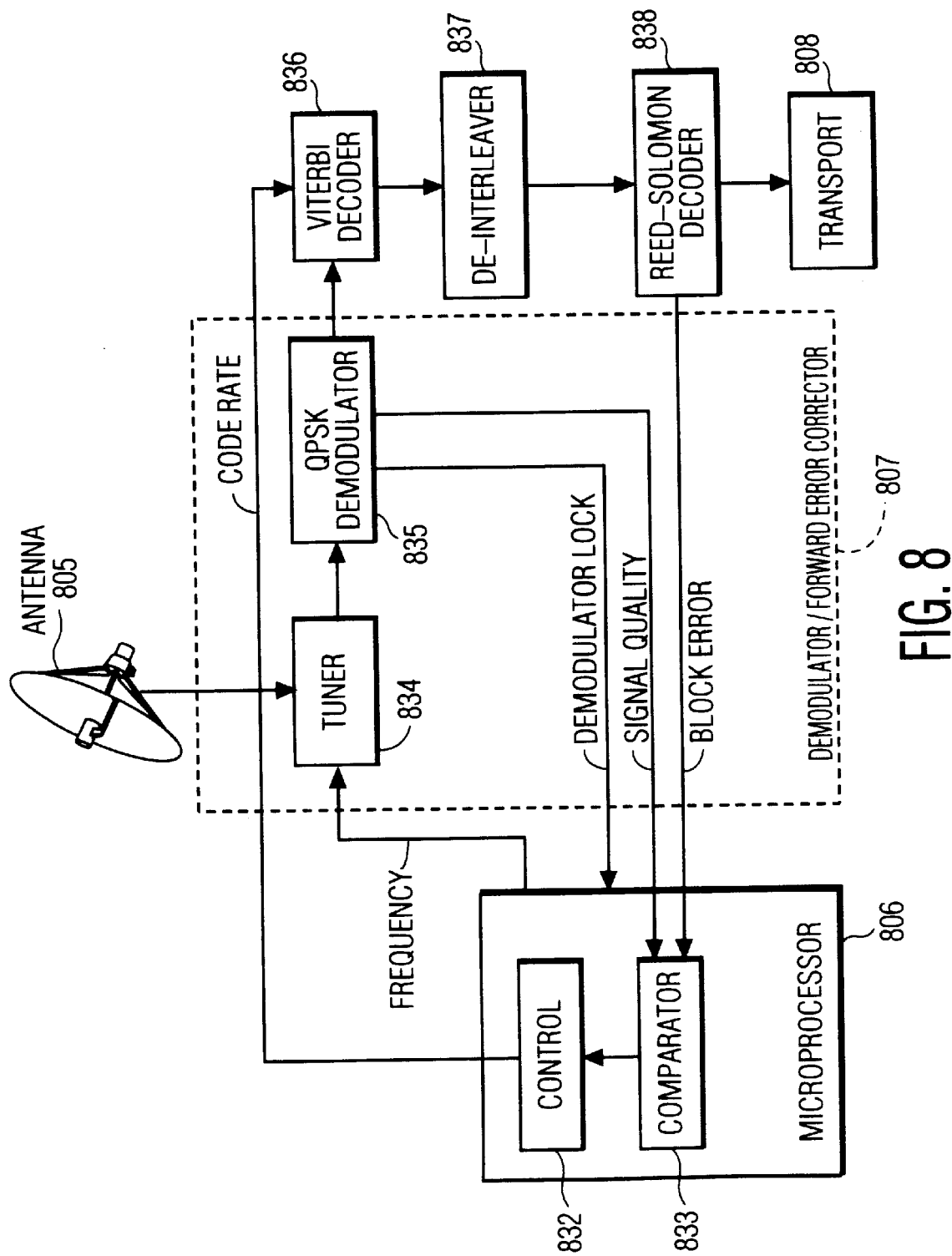
FIG. 8 is a block diagram of a portion of the IRD receiver unit of FIGS. 6 and 7, in detail.

Referring now to FIG. 8, demodulator/FEC unit 807 acquires, demodulates, and decodes the data signal which is received from antenna dish 805. This unit includes a tuner 834, a Quaternary Phase Shift Key (QPSK) demodulator 835, a Viterbi convolutional decoder 836, a de-interleaver 837, and a Reed-Solomon (RS) decoder 838, all of conventional design, arranged as shown.

Tuner 834 receives an input signal from antenna dish 805. Based upon a user's channel selection, a control unit 806 (i.e., a microprocessor) sends a frequency signal to tuner 834. This signal cause tuner 834 to tune to the appropriate channel and to downconvert the received signal in frequency in response to the tuning frequency signal sent to tuner 834 from microprocessor 806. An output signal from tuner 34 is provided to QPSK demodulator 835.

QPSK demodulator 835 locks onto (synchronizes with) the tuned channel, demodulates the modulated data signal, and generates a signal indicative of the quality of the demodulated signal. Demodulator 835 demodulates the modulated input data signal regardless of the error correction code rate of the received data signal. Phase-locked loop circuitry in demodulator 835 synchronizes the operation of demodulator 835 with the input signal using well-known techniques. Demodulator 835 generates a Demodulator Lock output control signal that indicates whether or not demodulator 835 is synchronized with the input signal, and supplies this signal to a storage register in microprocessor 806. an output demodulated data signal from unit 835 is provided to Viterbi decoder 836. Demodulator 835 also generates an output Signal Quality signal, which is indicative of the quality of the signal received from the satellite transmission, and is related to the signal-to-noise ratio of the received signal. Various sources of noise, as well as rain fade, may impair the quality of a received signal. A QPSK demodulator suitable for use as unit 835 is commercially available from Hughes Network Systems of Germantown, Md. (integrated circuit type No. 1016212), and from Comstream Corp. San Diego Calif. (No. CD2000).

Decoder 835 uses a Viterbi algorithm to decode and to correct bit errors in the demodulated signal from unit 835. Decoder 835 includes internal networks, as known, to synchronize its operation to the incoming demodulated signal in order to effectively decode the demodulated signal.

After decoder 835 decodes and error corrects the demodulated data signal, the decoded data signal is supplied to a de-interleaver 837. De-interleaver 837 restores the ordering of the data signal to its original sequence, and forms Reed-Solomon blocks (RS blocks), in accordance with known techniques. For this purpose de-interleaver 837 relies upon an 8-bit sync word inserted by the encoder at the beginning of each RS block, thereby providing RS block synchronization. The de-interleaved signal is supplied to a Reed-Solomon (RS) decoder 838.

RS decoder 838 decodes the RS blocks and corrects byte errors within a block. A decoded signal from Viterbi decoder 836 is provided to RS decoder 838 via de-interleaver 837. If decoder 36 uses the proper error correction decode rate to decode the data signal, de-interleaver 837 and Reed-Solomon decoder 838 will operate normally.

Thus, a digital multi-channel transmission system has been disclosed and described which allocates television programs to transponders and to time-multiplexed slots in the data stream of a given transponder in a way which is completely transparent to the user, who simply tunes a desired television program by selecting a virtual channel. It has been further explained above, that the key to the smooth operation of this system is the transmission of the master and special channel guides which relate transponder channels and program data positions in the transponder data stream to virtual channel numbers.

What is claimed is:

1. A signal processing apparatus, comprising:
   means for receiving a packetized signal and for identifying ancillary information included in said packetized signal, said ancillary information comprising:
   a) master guide information for use in identifying and acquiring special guide information; and
   b) special guide information for use in acquiring program information associated with a program included in said packetized signal; and
   means responsive to said ancillary information for acquiring said program from said packetized signal.

2. The apparatus of claim 1, wherein
   said master guide information is identified using a predetermined data identifier.

3. The apparatus of claim 2, wherein
   said master guide information includes data identifiers for use in acquiring said special guide information.

4. The apparatus of claim 3, wherein
   said special guide information is partitioned and said data identifiers identify partitioned segments of said special guide information.

5. The apparatus of claim 4, wherein
   said master guide information also identifies at least one of:
   (a) number of segments,
   (b) segment type,
   (c) segment address and
   (d) active segments.

6. The apparatus of claim 4, wherein
   said segments are hierarchically associated with said master guide information.

7. The apparatus of claim 6, wherein
   said segments are hierarchically arranged.

8. The apparatus of claim 4, wherein
   each of said partitioned segments comprises a table.

9. The apparatus of claim 1, wherein
   said special guide information contains information segments for use in identifying and acquiring channels and programs.

10. The apparatus of claim 9, wherein
    said information segments for use in identifying and acquiring channels comprises a list of available channels and pointers to associated programs.

11. The apparatus of claim 8, wherein
    said information segments for use in identifying and acquiring programs includes:
    (a) program guide information listing program start times, and
    (b) duration.

12. The apparatus of claim 4, wherein said auxiliary information includes system information including at least one of encryption keys for use in decrypting encrypted programs and error detection data.

13. The apparatus of claim 11, wherein said master guide information contains a program segment map including a linked array of elements including one or more of:
   (a) title,
   (b) start time,
   (c) duration,
   (d) rating and
   (e) category of each program.

14. The apparatus of claim 1, wherein
said ancillary information includes program map identifiers for identifying audio and video components of an individual program.

15. The apparatus of claim 9, wherein said auxiliary information associates each individual program with a program content rating.

16. Method for forming a packetized signal comprising the steps of:
   forming ancillary information including program guide information for inclusion in said packetized signal, said ancillary information including:
      a) master guide information for use in identifying and acquiring special guide information; and
      b) special guide information for use in acquiring program information; and
   incorporating in said ancillary information data for use in linking and assembling packets comprising said master guide information and said special guide information in a decoder.

17. The method of claim 16, further including the step of:
incorporating a predetermined data identifier for identifying the master guide information in the packetized signal.

18. The apparatus of claim 1, wherein said master guide information includes program related data associated with programs transmitted during a first time period, and said special guide information includes program related data associated with programs transmitted during a second time period, said second time period following said first time period.

19. A method for processing a packetized signal, the method comprising the steps of:
   acquiring ancillary information included in the packetized signal;
   identifying master guide information included in the ancillary information;
   identifying special guide information included in the ancillary information using the master guide information, and using the special guide information to determine program information associated with a program included in the packetized signal; and
   acquiring the program included in the packetized signal in response to the ancillary information.

20. The method of claim 19, wherein the master guide information identifying step comprises identifying master guide information using a predetermined data identifier.

21. The method of claim 19, wherein the program acquiring step comprises acquiring a first program transmitted during a first period of time in response to the master guide information and acquiring a second program transmitted during a second period of time in response to the special guide information, the second time period following the first time period.

* * * * *